March 9, 1937.  C. G. IVEY  2,073,155
BASKET STAND
Filed July 11, 1935
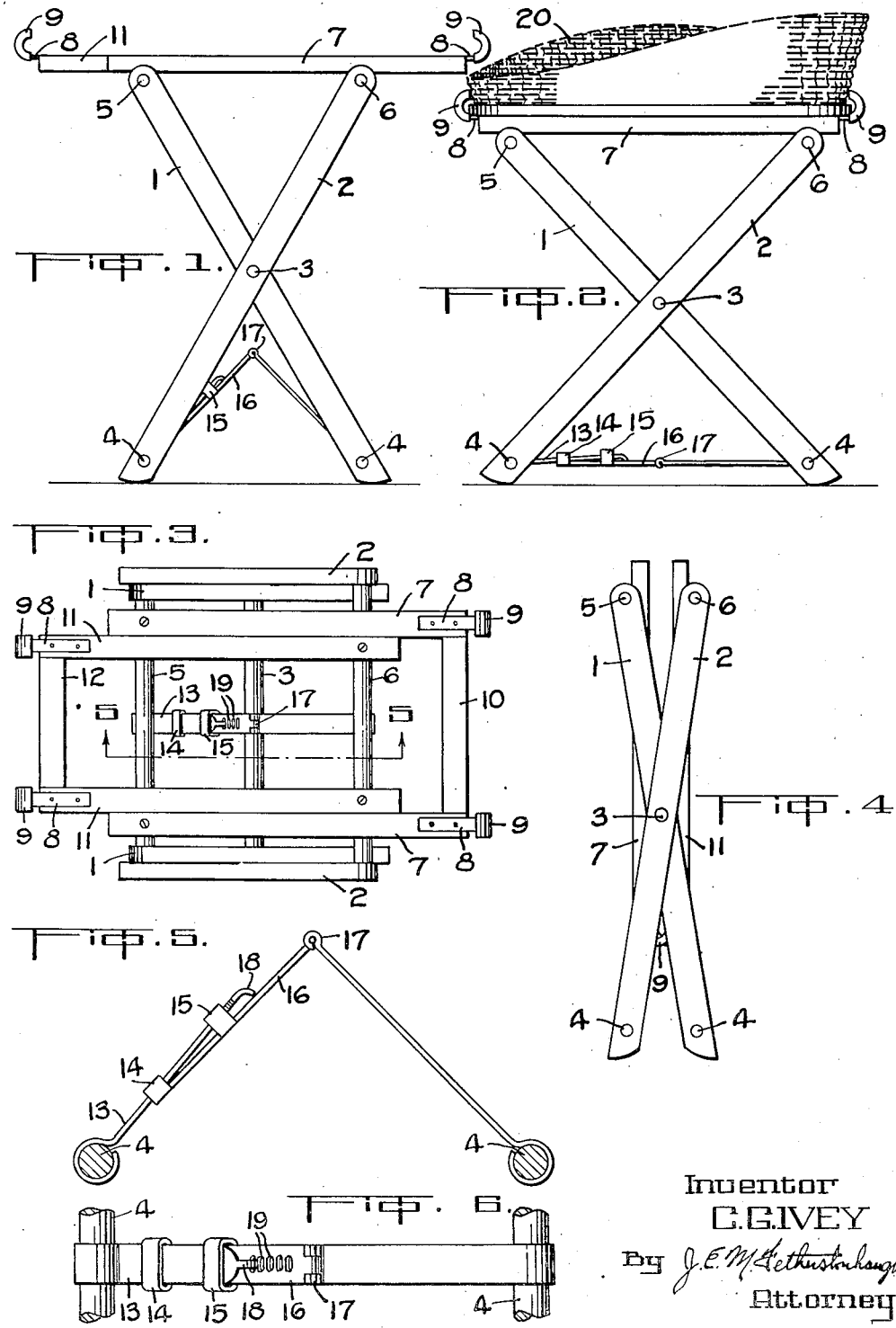
Inventor
C. G. IVEY
By J. E. M. Featherstonhaugh
Attorney Patented Mar. 9, 1937

2,073,155

UNITED STATES PATENT OFFICE 2,073,155

BASKET STAND

Charles Gladstone Ivey, Port Dover, Ontario, Canada, assignor to Imogen Elizabeth Ivey, Port Dover, Ontario, Canada Application July 11, 1935, Serial No. 30,823
In Canada June 29, 1935

2 Claims. (Cl. 248—150)

My invention relates to improvements in basket stands, and an object thereof is to devise a supporting stand for a laundry basket, the placing of the basket on the stand serving to engage the stand securely with the basket to permit the two to be carried about as a unit.

Another object of my invention is to provide such a stand which will readily engage baskets of a number of different sizes.

Yet another object is to devise a basket stand which may be readily folded up for storing or transportation.

A still further object is to provide a stand in which foot operable means are provided for locking the stand in the basket engaging position.

With these and other objects in view which will hereinafter appear as the specification proceeds, my invention consists, in its preferred embodiment of the construction and arrangement all as hereinafter more particularly described and illustrated with reference to the accompanying drawing, in which:

Fig. 1 is a side elevational view of my basket stand showing the basket engaging members extended and ready to receive a basket;

Fig. 2 is a similar view showing the basket engaging members drawn into engagement with the base of an orthodox laundry basket;

Fig. 3 is a plan view of my stand in the position of Fig. 1;

Fig. 4 is a side elevational view of the stand folded up;

Fig. 5 is a detail view, somewhat enlarged, of the means for locking the stand in the basket engaging position, taken along the line 5—5 of Fig. 4; and Fig. 6 is a plan view of the detail shown in Fig. 5.

Like characters of reference indicate corresponding parts in the different views.

Referring to the drawing, my basket stand comprises two pair of legs 1 and 2 pivoted in X formation on and spaced apart by a bar 3. Bars 4 join the lower ends of corresponding legs, and bars 5 and 6 connect the upper ends of the legs 1, 1 and 2, 2 respectively and are rotatably secured thereto.

A pair of arms 7, 7 are secured at one end to the bar 5, their free ends being adapted to rest and slide on the other bar 6. A basket engaging hook 8 is secured to the upper surface of each arm 7, such hooks being preferably of spring material and having a resilient sleeve 9 therearound to prevent marring of the basket, and a bar 10 may be secured between the free ends of the arms 7 to impart lateral rigidity thereto. A second pair of arms 11 secured at one end of each to the bar 6 and having their free ends joined by a bar 12 overlie the bar 5 and are adapted to lie between the bars 7, 7 and also carry basket engaging hooks 8 protected by the sleeves 9.

The bars 4 are adapted to be held apart by a locking device comprising a strap member 13 swingably secured at one extremity to a bar 4, the other extremity being adapted to pass through loops 14 and 15 on one extremity of a second strap member 16, the latter having a hinge 17 intermediate its ends and being swingably secured at its other extremity to the second bar 4. A projection 18 on the strap member 13 is turned over and is adapted to enter one of a series of orifices 19 in the strap member 16.

The operation of my device is as follows: with the stand set up as shown in Fig. 1, a basket 20 may be placed thereon with the bottom thereof resting on the arms 7 and 11. The weight of the basket will then cause the pairs of legs 1 and 2 to open up, i. e. the bars 5 and 6 will separate, causing the free ends of the bars 7 and 11 to slide on the bars 6 and 5 respectively so that the pair of hooks 8 on the bars 7 approach the pair on the bars 11 until the basket 20 is firmly grasped therebetween. The stand may then be locked in the basket engaging position by pressing downwardly on the hinge 17, which may be conveniently done with the foot. Since the loop 15 is considerably deeper than the loop 14, downward pressure on the hinge 17 permits the member 13 to slide through the loops without the projection 18 entering any of the orifices 19 until the hinge 17 passes a line joining the centres of the bars 4. Further downward movement of the hinge 17 then causes the projection 18 to enter the nearest orifice to lock the legs of the stand apart to prevent disengagement of the basket from the hooks. To release the basket from the stand, it is only necessary to lift the hinge 17 to close up the stand and separate the basket engaging hooks.

To fold up the stand, the arms 7 and 11 may be swung upwardly and outwardly and their free ends allowed to drop down toward the bars 4, after which the legs of the stand may be closed up into the position shown in Fig. 4.

An advantage of my improved basket stand is that it securely engages a basket placed thereon substantially automatically, the weight of the basket serving to actuate the basket clamping means. In addition, the means for locking the stand in the basket engaging position is footoperated, so that it may be actuated very conveniently.

Another advantage of my device is that it may be used with equal facility with baskets of different sizes without any adjustment being required.

Still another advantage of the device is that it may be easily folded up into a compact unit for carrying or for storage.

While I have shown and described one preferred embodiment of my invention, such disclosure is intended to be purely illustrative, and to impose no limitation on the scope of my invention not set forth in the appended claims.

What I claim as my invention is:

1. A basket supporting stand, adapted to releasably engage a basket placed thereon, comprising two pairs of legs, the legs of each pair being pivotally secured together in X formation, transverse bars joining corresponding extremities of the legs of each pair, a basket supporting member pivoted at one extremity on each of the upper transverse bars and overlying the opposite bar, means on the free extremity of each basket supporting member adapted to be drawn into engagement with the basket when said upper bars are caused to separate by the weight of the basket when the latter is placed on the stand, and releasable foot operable means connected with the lower longitudinal bars for locking the stand with the basket engaging means in the basket engaging position.

2. A basket supporting stand as claimed in claim 1 wherein said basket engaging means comprises a resilient inwardly directed hook secured to the free extremity of each basket supporting member.

CHARLES GLADSTONE IVEY.